(12) United States Patent
Kim et al.

(10) Patent No.: US 9,100,102 B2
(45) Date of Patent: Aug. 4, 2015

(54) METHOD TO USE A PREAMBLE WITH BAND EXTENSION IN POWER LINE COMMUNICATIONS

(71) Applicant: Texas Instruments Incorporated, Dallas, TX (US)

(72) Inventors: Il Han Kim, Allen, TX (US); Tarkesh Pande, Richardson, TX (US); Anuj Batra, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/052,913

(22) Filed: Oct. 14, 2013

(65) Prior Publication Data

US 2014/0105313 A1     Apr. 17, 2014

Related U.S. Application Data

(63) Continuation-in-part of application No. 13/347,366, filed on Jan. 10, 2012, now abandoned.

(60) Provisional application No. 61/431,518, filed on Jan. 11, 2011, provisional application No. 61/712,922, filed on Oct. 12, 2012, provisional application No. 61/713,967, filed on Oct. 15, 2012, provisional application No. 61/718,419, filed on Oct. 25, 2012, provisional application No. 61/720,448, filed on Oct. 31, 2012.

(51) Int. Cl.
*H04B 3/00* (2006.01)
*H04B 3/54* (2006.01)

(52) U.S. Cl.
CPC ........ *H04B 3/542* (2013.01); *H04B 2203/5433* (2013.01); *H04B 2203/5466* (2013.01)

(58) Field of Classification Search
CPC ....................................................... H04B 3/00
USPC ......................................................... 375/257
See application file for complete search history.

(56) References Cited

U.S. PATENT DOCUMENTS

| | | | | |
|---|---|---|---|---|
| 5,896,374 A | * | 4/1999 | Okumura et al. | 370/311 |
| 2001/0052098 A1 | * | 12/2001 | Miyauchi et al. | 714/746 |
| 2006/0256883 A1 | * | 11/2006 | Yonge et al. | 375/260 |
| 2009/0175291 A1 | * | 7/2009 | Galli et al. | 370/442 |
| 2010/0183087 A1 | * | 7/2010 | Hosokawa et al. | 375/262 |

* cited by examiner

*Primary Examiner* — Lihong Yu
(74) *Attorney, Agent, or Firm* — Steven A. Shaw; Frank D. Cimino

(57) ABSTRACT

Embodiments include methods of powerline communications using a preamble with band extension is provided. A method may include receiving a packet data unit PDU. Bit-level repetition is applied to at least a portion of the PDU to create a repeated portion. Interleaving is performed per a subchannel. Pilot tones are inserted in the interleaved portion. Each data tone is modulated with respect to a nearest one of the inserted pilot tones. The PDU is transmitted over a power line.

20 Claims, 8 Drawing Sheets

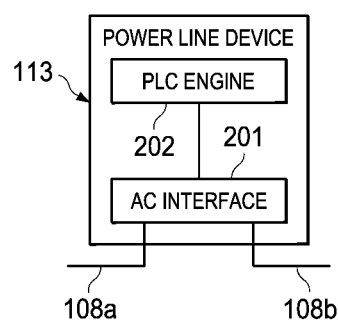
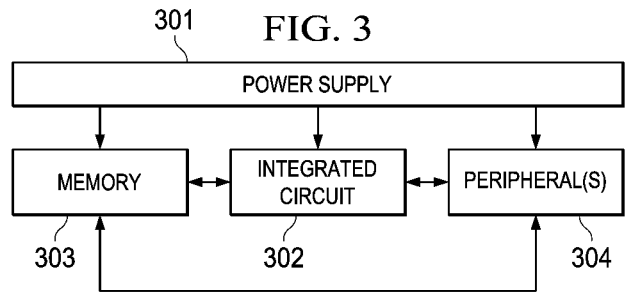

METHOD TO USE A PREAMBLE WITH BAND EXTENSION IN POWER LINE COMMUNICATIONS

CROSS REFERENCE TO RELATED APPLICATIONS

This application is a Continuation-in-Part of and claims priority to U.S. application Ser. No. 13/347,366 filed on Jan. 10, 2012 now abandoned which claims the benefit of U.S. Provisional Application Ser. No. 61/431,518 titled "Proposal for PHY Issues and Discussion of Backward Compatibility" and filed Jan. 11, 2011. This application also claims the benefit of U.S. Provisional Application Nos. 61/712,922, filed on Oct. 12, 2012; 61/713,967 filed on Oct. 15, 2012; 61/718,419 filed on Oct. 25, 2012; and 61/720,448 filed on Oct. 31, 2012. All applications are herein incorporated by reference in their entirety.

FIELD

This specification is directed, in general, to power line communications, and, more specifically, to systems and methods of using a preamble with band extension in power line communications.

BACKGROUND

Powerline communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

Various PLC standardizing efforts are currently being undertaken around the world, each with its own unique characteristics. Generally speaking, PLC systems may be implemented differently depending upon local regulations, characteristics of local power grids, etc. Examples of competing PLC standards include the IEEE 1901, HomePlug AV, and ITU-T G.hn (e.g., G.9960 and G.9961) specifications. Another standardization effort includes, for example, the Powerline-Related Intelligent Metering Evolution (PRIME) standard designed for OFDM-based (Orthogonal Frequency-Division Multiplexing) communications. The current or existing PRIME standard referred to herein is the Draft Standard prepared by the PRIME Alliance Technical Working Group (PRIME R1.3E) and earlier versions thereof.

Current and next generation narrowband PLC are multicarrier based, such as orthogonal frequency division multiplexing (OFDM)-based (as opposed to single carrier-based) in order to get higher network throughput. OFDM uses multiple orthogonal subcarriers to transmit data over frequency selective channels. A conventional OFDM structure for a data frame includes a preamble, followed by a physical layer (PHY) header, a media access control (MAC) header, followed by a data payload.

PLC channels are known to be highly challenging environments for digital communication because they suffer from periodic bursts of impulse noise, and the channel impulse response also varies over time.

A conventional preamble structure for a narrowband OFDM PLC standard, e.g. IEEE P1901.2, or G3, includes 8 syncP symbols followed by 1.5 syncM symbols. There is no cyclic prefix between adjacent symbols in the preamble. As known in the art, syncP is a known preamble sequence, and syncM=−syncP. As example, a syncP preamble can be a chirp-like sequence (there many possibilities depending on the chirp rate), a specific binary sequence of 1's and −1's, or a cazac sequence. The definition of the syncP symbol for the FCC band in IEEE P1901.2 involves specifying phases at different tones. Other standard bands include but not limited to Association of Radio Industries and Businesses (ARIB) band, CEN-B Band, FCC-Low band, and FCC bands with 18 tones and 36 tones.

The preamble serves purposes including the following purposes:
1) helps to indicate to other nodes in the PLC network that a transmission is in progress;
2) helps to determine the frame boundary (i.e. the boundary between the preamble and the PHY header, and between the PHY header and the data),
3) can be used to obtain accurate channel estimates, and
4) can be used for frequency offset compensation.

SyncM symbols help determine the frame boundary. The repetitive syncP symbols also assists in preamble detection as receiver nodes are looking for the repetitive sequence of symbols in the PLC channel to determine whether or not a frame is on the powerline. Multiple syncP's also help in obtaining more accurate channel estimates because averaging the channel estimates across multiple syncP's helps reduce the noise. Improved channel estimates also helps in improving the header decoding performance, especially when the header is coherently modulated with respect to the syncP preamble.

BRIEF DESCRIPTION OF THE DRAWINGS

Reference will now be made to the accompanying drawings, which are not necessarily drawn to scale, wherein:

FIG. 2 is a block diagram of a PLC device or modem according to some embodiments.

FIG. 3 is a block diagram of an integrated circuit according to some embodiments.

DETAILED DESCRIPTION

Disclosed embodiments now will be described more fully hereinafter with reference to the accompanying drawings. Such embodiments may, however, be embodied in many different forms and should not be construed as limited to the embodiments set forth herein. Rather, these embodiments are provided so that this disclosure will be thorough and complete, and will fully convey the scope of this disclosure to those having ordinary skill in the art. One having ordinary skill in the art may be able to use the various disclosed embodiments and there equivalents. As used herein, the term "couple" or "couples" is intended to mean either an indirect or direct electrical connection unless qualified as in "communicably coupled" which includes wireless connections. Thus, if a first device couples to a second device, that connection may be through a direct electrical connection, or through an indirect electrical connection via other devices and connections.

Figure 1:
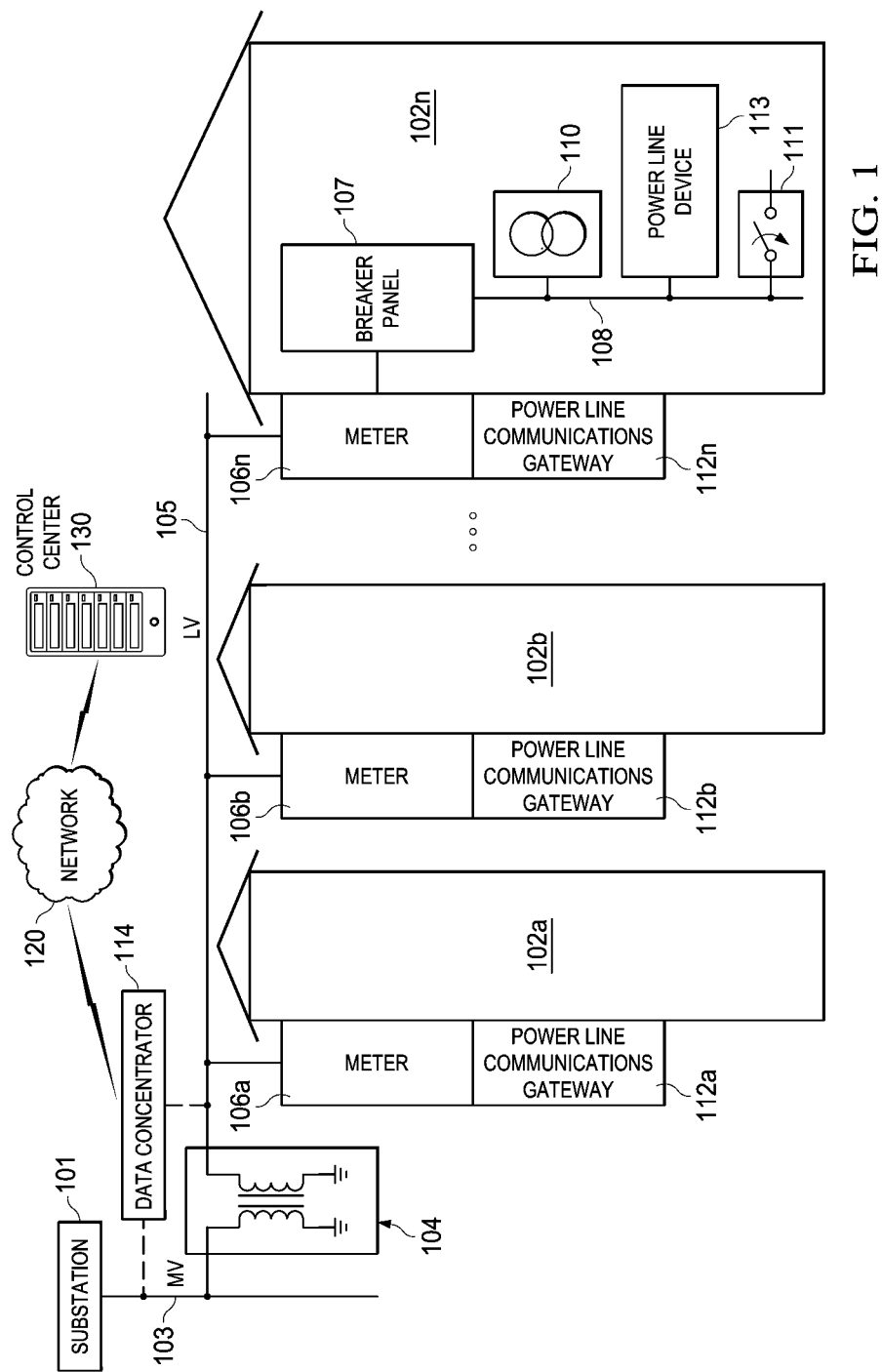
FIG. 1 is a block diagram of a power line communication (PLC) environment according to some embodiments.

Turning to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a based node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.).

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

FIG. 2 is a block diagram of PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

In various embodiments, PLC device 113 may be implemented at least in part as an integrated circuit. FIG. 3 is a block diagram of such an integrated circuit. In some cases, one or more of meter 106, gateway 112, PLC device 113, or data concentrator 114 may be implemented similarly as shown in FIG. 3. For example, integrated circuit 302 may be a digital signal processor (DSP), an application specific integrated circuit (ASIC), a system-on-chip (SoC) circuit, a field-programmable gate array (FPGA), a microprocessor, a microcontroller, or the like. As such, integrated circuit 302 may implement, at least in part, at least a portion of PLC engine 202 shown in FIG. 2. Integrated circuit 302 is coupled to one or more peripherals 304 and external memory 303. Further, integrated circuit 302 may include a driver for communicating signals to external memory 303 and another driver for communicating signals to peripherals 304. Power supply 301 is also provided which supplies the supply voltages to integrated circuit 302 as well as one or more supply voltages to memory 303 and/or peripherals 304. In some embodiments, more than one instance of integrated circuit 302 may be included (and more than one external memory 303 may be included as well).

Peripherals 304 may include any desired circuitry, depending on the type of PLC device or system. For example, in some embodiments, peripherals 304 may implement, at least in part, at least a portion of a PLC modem (e.g., portions of AC interface 210 shown in FIG. 2). Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc.

External memory 303 may include any type of memory. For example, external memory 303 may include SRAM, non-volatile RAM (NVRAM, such as "flash" memory), and/or dynamic RAM (DRAM) such as synchronous DRAM (SDRAM), double data rate (DDR, DDR2, DDR3, etc.) SDRAM, etc. External memory 303 may include one or more memory modules to which the memory devices are mounted, such as single inline memory modules (SIMMs), dual inline memory modules (DIMMs), etc.

Figure 4:
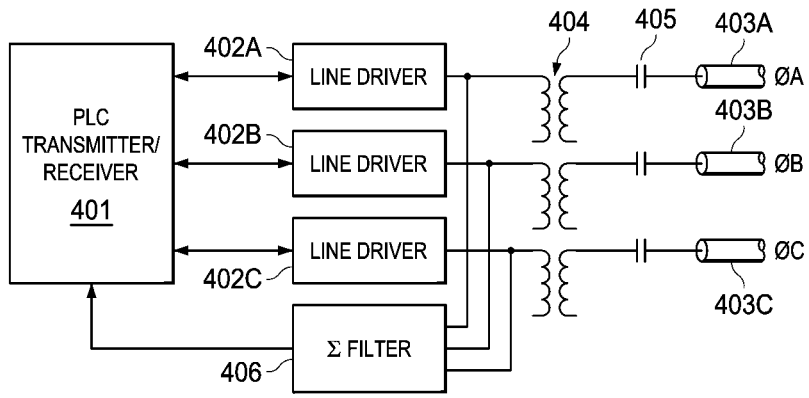
FIGS. 4-6 are block diagrams illustrative of connections between a PLC transmitter and/or receiver circuitry to three-phase power lines according to some embodiments.

In various implementations, PLC device or modem 113 may include transmitter and/or receiver circuits configured to connect to power lines 103, 105, and/or 108. FIG. 4 illustrates the connection between the power line communication transmitter and/or receiver circuitry to the power lines according to some embodiments. PLC transmitter/receiver 401 may function as the transmitter and/or receiver circuit. PLC transmitter/receiver 401 generates pre-coded signals for transmission over the power line network. Each output signal, which may be a digital signal, is provided to a separate line driver circuit 402A-C. Line drivers 402A-C comprise, for example, digital-to-analog conversion circuitry, filters, and/or line drivers that couple signals from PLC transmitter/receiver 401 to power lines 403A-C. Transformer 404 and coupling capacitor 405 link each analog circuit/line driver 402 to its respective power line 403A-C. Accordingly, in the embodiment illustrated in FIG. 4, each output signal is independently linked to a separate, dedicated power line.

FIG. 4 further illustrates an alternate receiver embodiment. Signals are received on power lines 403A-C, respectively. In an embodiment, each of these signals may be individually received through coupling capacitors 405, transformers 404, and line drivers 402 to PLC transmitter/receiver 401 for detection and receiver processing of each signal separately. Alternatively, the received signals may be routed to summing filter 406, which combines all of the received signals into one signal that is routed to PLC transmitter/receiver 401 for receiver processing.

Figure 5:
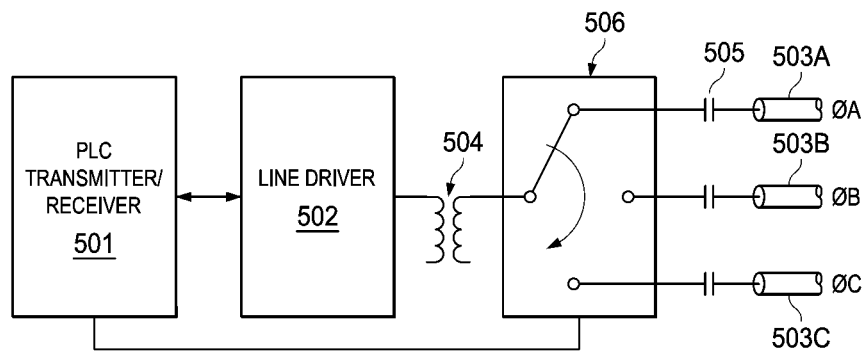

FIG. 5 illustrates an alternative embodiment in which PLC transmitter/receiver 501 is coupled to a single line driver 502, which is in turn coupled to power lines 503A-C by a single transformer 504. All of the output signals are sent through line driver 502 and transformer 504. Switch 506 selects which power line 503A-C receives a particular output signal. Switch 506 may be controlled by PLC transmitter/receiver 501. Alternatively, switch 506 may determine which power line 503A-C should receive a particular signal based upon information, such as a header or other data, in the output signal. Switch 506 links line driver 502 and transformer 504 to the selected power line 503A-C and associated coupling capacitor 505. Switch 506 also may control how received signals are routed to PLC transmitter/receiver 501.

Figure 6:
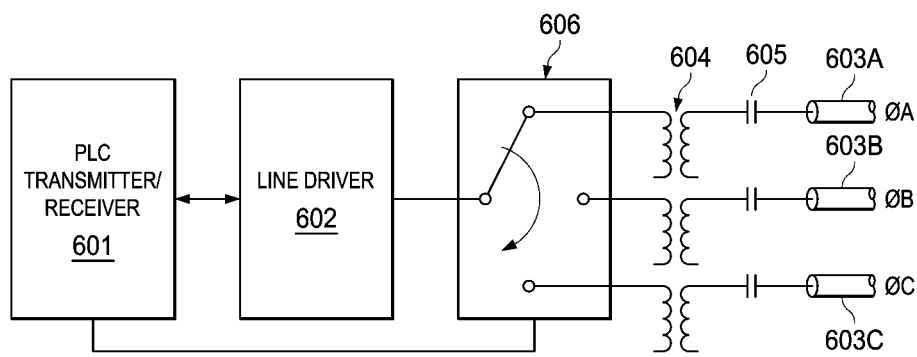

FIG. 6 is similar to FIG. 5 in which PLC transmitter/receiver 1901 is coupled to a single line driver 1902. However, in the embodiment of FIG. 6, power lines 603A-C are each coupled to a separate transformer 604 and coupling capacitor 605. Line driver 602 is coupled to the transformers 604 for each power line 603 via switch 606. Switch 606 selects which transformer 604, coupling capacitor 605, and power line 603A-C receives a particular signal. Switch 606 may be controlled by PLC transmitter/receiver 601, or switch 606 may determine which power line 603A-C should receive a particular signal based upon information, such as a header or other data, in each signal. Switch 606 also may control how received signals are routed to PLC transmitter/receiver 601.

In some embodiments, the circuits described above (and/or the computer system shown in FIG. 14) may implement signal processing operations configured to generate, transmit, and/or receive one or more PLC signals communicated over one or more power lines. Generally speaking, these PLC signals may be transmitted in the form of data frames or Protocol Data Units (PDUs), each such PDU including a preamble, a header, and a payload. For any given PLC standard, certain systems and methods described herein may provide one or more "robust" modes of operation that may enable, among other things, more reliable communications in severe channel environments. As described in more detail below, implementing a given robust mode of operation may include adding bit-level repetition, multiple-symbol interleaving, and/or nearest-pilot tone modulation to the processing prescribed by a given PLC standard. Also, in various embodiments, different robust modes of operation may include modifications to the PDU's header, payload, or both.

In some cases, a robust mode may be seen as a subsequent version of an existing standard. For instance, in a particular situation where one or more techniques described herein are applied to the PRIME 1.3E standard, the PRIME 1.3E standard may thereafter be considered a "legacy standard," and PLC devices operating under that protocol to transmit and receive "legacy PDUs" may be designated as "legacy devices." In contrast, the robust version of the PRIME 1.3E standard may be part of a subsequent version of that standard (e.g., "PRIME 1.4"), and devices capable of operating using the new protocol to transmit and receive "robust PDUs" may be referred to as "robust devices." As described below, robust PDUs and/or headers may be modified to enable device-level and network-level compatibility among devices and nodes supporting legacy and robust protocols.

Figure 7:
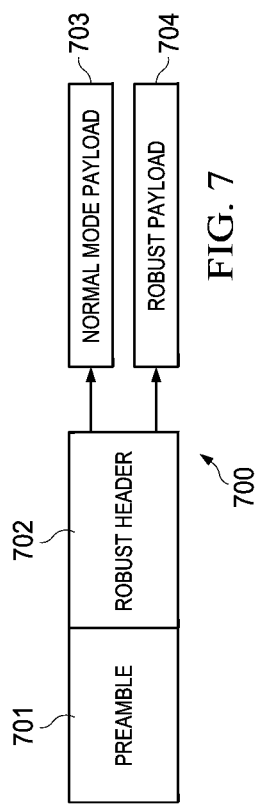
FIG. 7 is a diagram of a robust protocol data unit (PDU) according to some embodiments.

Turning now to FIG. 7, a diagram of a robust PLC packet or PDU is depicted according to some embodiments. Particularly, robust PDU 700 includes preamble portion 701, header portion 702, and one of payload portions 703 or 704, depending upon whether the communication is utilizing a normal payload mode or a robust payload mode, respectively. In some cases, use of normal or robust payload modes may be indicated in header portion 702, which may itself be robust. Therefore, with respect to the types of payload that may be used, a first robust protocol may use a robust header portion (e.g., 702) and a "normal" payload portion (e.g., 703), and a second robust mode may use both a robust header portion (e.g., 702) and a robust payload portion (e.g., 704). (A comparison between legacy, normal, and robust payload portions is discussed in more detail below with respect to Table 2.)

Generally speaking, each of portions 701-704 may contain different symbols (e.g., OFDM symbols) and may have distinct formats depending upon the PLC standard being used in a given communication. For instance, the G3 and G.9955 standards are largely similar. Nonetheless, there are differences between them in terms of sampling frequency, tone spacing, coherent/differential modulation, etc. In some cases, the various embodiments described below, systems and methods for generating, transmitting, and/or receiving PLC frames may be used with any such PLC standard (e.g., PRIME, G3 CENELEC A, G3 FCC, G.hnem, IEEE 1901.2 devices, SFSK, etc.).

In certain embodiments implementing the PRIME standard, preamble portion 701 of robust PDU 700 may include a chirp preamble 2.048 ms long, similar to PRIME 1.3E. However, header portion 703 of robust PDU 700 may differ from the header of a legacy, PRIME 1.3E PDU, as described in Table 1 below:

TABLE 1

| PRIME 1.3E Header | Robust Header |
| --- | --- |
| 13 pilot tones, 84 data subcarriers | 17 pilot tones, 80 data subcarriers |
| Differential Binary Phase Shift Keying (DBPSK), Forward Error Correction (FEC) on | DBPSK, FEC on, 4-bit repetitions |
| Frequencies are differential with respect to previous subcarrier | Frequencies are differential with respect to nearest pilot tone |
| One-symbol interleaver | Four-symbol interleaver |
| 2 symbols of 2.24 ms each | 4 symbols of 2.24 ms each |

Also, normal mode payload 703 and robust mode payload 704 may each differ from the payload of a legacy PRIME 1.3E payload, as shown in Table 2 below:

TABLE 2

| PRIME 1.3E Payload | Normal Mode Payload | Robust Mode Payload |
| --- | --- | --- |
| 0-63 symbols of 2.24 ms each | 0-61 symbols of 2.24 ms each | 0-61 symbols of 2.24 ms each |
| 1 pilot, 96 data subcarriers | 1 pilot, 96 data subcarriers | 17 pilots, 80 data subcarriers |
| DBPSK, Differential Quaternary Phase-Shift Keying (DQPSK), Eight-ary Differential Phase-Shift Keying (D8PSK), FEC on/off | DQPSK, D8PSK, FEC off | DBPSK, FEC on, 4-bit repetitions |

TABLE 2-continued

| PRIME 1.3E Payload | Normal Mode Payload | Robust Mode Payload |
| --- | --- | --- |
| Frequencies are differential with respect to previous subcarrier | Frequencies are differential with respect to previous subcarrier | Frequencies are differential with respect to nearest pilot tone |
| One-symbol interleaver | Four-symbol interleaver | Four-symbol interleaver |

Figure 8:
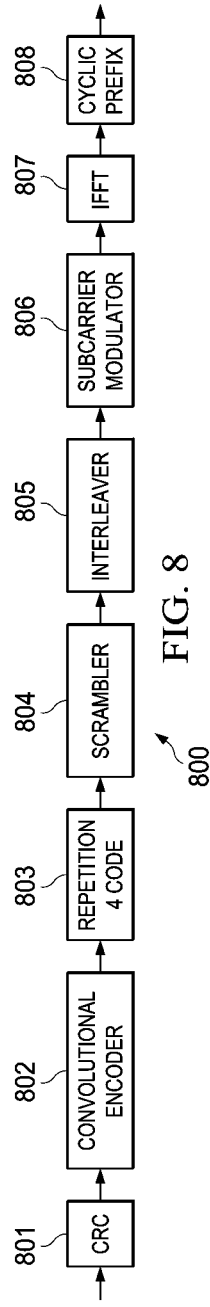
FIG. 8 is a block diagram of components of the transmitter using a 4-bit repetition code at the output of the convolutional encoder according to some embodiments.

To illustrate a method of building a robust PDU as discussed above, reference is first made to FIG. 8, where a block diagram of components of a transmitter using a 4-bit repetition code at the output of the convolutional encoder is depicted according to some embodiments. As shown, the Physical (PHY) layer receives PDU inputs from the Media Access Control (MAC) layer. The PDU passes through cyclic redundancy check (CRC) block 801 and then is convolutionally encoded in convolutional encoder 802. Block 803 applies a 4-bit repetition to the output of encoder 802. For example, when the output of encoder 802 is the bit stream or sequence: $\{b_0, b_1, b_2, \ldots\}$, the output of block 803 is $\{b_0, b_0, b_0, b_0, b_1, b_1, b_1, b_1, b_2, b_2, b_2, b_2, \ldots\}$. In some implementations, 4-bit repetition for payload bits may be enabled when using Binary Phase Shift Keying (BPSK) modulation and convolutional coding.

The output of block 803 is scrambled in scrambler 804. The output of scrambler 804 is interleaved in interleaver 805 and then differentially modulated in subcarrier modulator 806. In some cases, scrambler 804 may be absent and the output of block 803 may be processed by interleaver 805. As shown in Tables I-II above, different portions of the PDU may be modulated using a Differential Binary Phase Shift Keying (DBPSK), Differential Quaternary Phase Shift Keying (DQPSK), or Differential Eight-Phase Shift Keying (DBPSK) schemes. Then, OFDM is performed in Inverse Fast Fourier Transform (IFFT) block 807 and cyclic prefix generator 808.

On the receiver, side blocks 801-808 may be used in the reverse order to decode/demodulated received PDUs. It should be noted that, in alternative embodiments, the order of blocks 801-808 shown in FIG. 8 may be modified (e.g., 4-bit repeater 803 may be located between blocks 850 and 806). Also, 2-bit repetition may be selected as an alternative to 4-bit repetition (yielding additional robust modes of operation).

Figure 9:
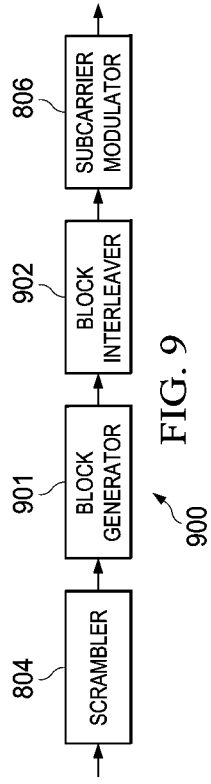
FIG. 9 is a block diagram of additional components of the transmitter using 4-symbol block interleaving according to some embodiments.

FIG. 9 is a block diagram of additional components of a transmitter using 4-symbol block interleaving according to some embodiments. As shown, the output of scrambler 804 may be received by block generator 901 and processed by block interleaver 902 before reaching subcarrier modulator 806. In other words, compared with FIG. 8, here generator 901 and interleaver 902 replace interleaver 805. Similarly as before, when scrambler 804 is absent from the transmitter, the output of encoder 802 or of 4-bit repeater 803 may be coupled to block generator 901 instead.

For example, when the output of scrambler 804 (or encoder 802/4-bit repeater 803) is an array of OFDM symbols (e.g., $B_0, B_1, B_2, \ldots$), block generator 901 may group these symbols into blocks having L bits per symbol (e.g., Block 1: $[B_0, B_1, \ldots, B_{4L-1}]$, Block 2: $[B_{4L}, B_{4L+1}, \ldots, B_{8L-1}], \ldots$ Block m: $[B_{(m-1)L}, \ldots, B_{mL-1}]$), where L is an integer. In other words, the input to block generator 901 may be partitioned into blocks of 4 L bits. In some cases, if the last block (e.g., Block m) does not contain enough bits, the symbols may be cyclically repeated until 4 L bits are obtained (e.g., if the last block contains $b_1, b_2, \ldots, b_8$ and 4 L=12, then Block m may use $b_1, b_2, \ldots, b_8, b_1, b_2, \ldots b_8$). Moreover, block interleaver 902 may perform interleaving over four consecutive OFDM symbols. (This is in contrast with PRIME 1.3E, which performs one-symbol interleaving.) Also, in some embodiments, block interleaving may be performed when FEC is turned on.

Figure 10:
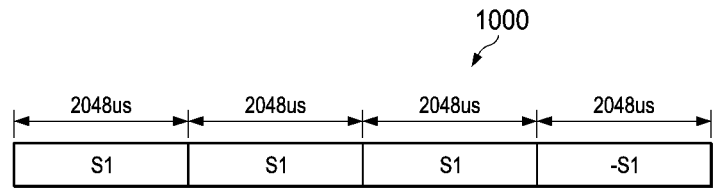
FIG. 10 shows preamble in accordance with a further embodiment of the invention.

FIG. 10 shows a PRIME version 1.3.6 type chirp preamble with duration of 8.192 ms 1000. The computational complexity is the same as PRIME1.3.6 because of the longer duration of the preamble but boosting by 3 dB because preamble has lower PAPR. S1=A rect(t/T) cos(2pi*(f0*t+½*mu*t^2)); f0=41992 Hz, ff=88867 Hz, mu=(ff−f0)/T; where 0<t<8192 us.

Figure 11:
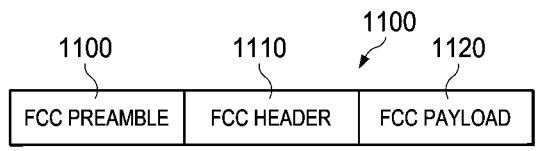
FIG. 11 is a diagram illustrative of a frame in accordance with an embodiment of the invention.

FIG. 11 shows a frame 1100 with FCC the preamble 1000 of 8.192 ms 94 OFDM symbols combined with header 1110 of 4 OFDM symbols and payload of 4 to 252 OFDM symbols 520.

Subchannel planning. Multiple subchannels may be used. Decision on which subchannels are to be used done at deployment stages. Depends on decisions from deployers depending on applications. Not adaptive, but fixed $$S = \sum_{i=1}^{K} S_i = \sum_{i=1}^{K} A \cdot rect(t/T) \cdot \cos[2\pi(f_0^i t + 1/2\mu_i t^2)]$$

where T=2048 us, $f_0^i$=end frequency of the channel i, $f_f^i$=starting frequency of the channel i, $\mu_i=(f_f^i-f_0^i)/T$. One single correlator is used for four repetition symbols.

Header may be defined as follows:
PHY.LEN: 8 bit
PHY.PROTOCOL: 4 bits
PHY.PAD_LEN: 9 bits
PHY.RESERVED: 3 bits
PHY.CRC: 12 bits For more band usage, more bits may be allocated because more bits are available.

Figure 12:
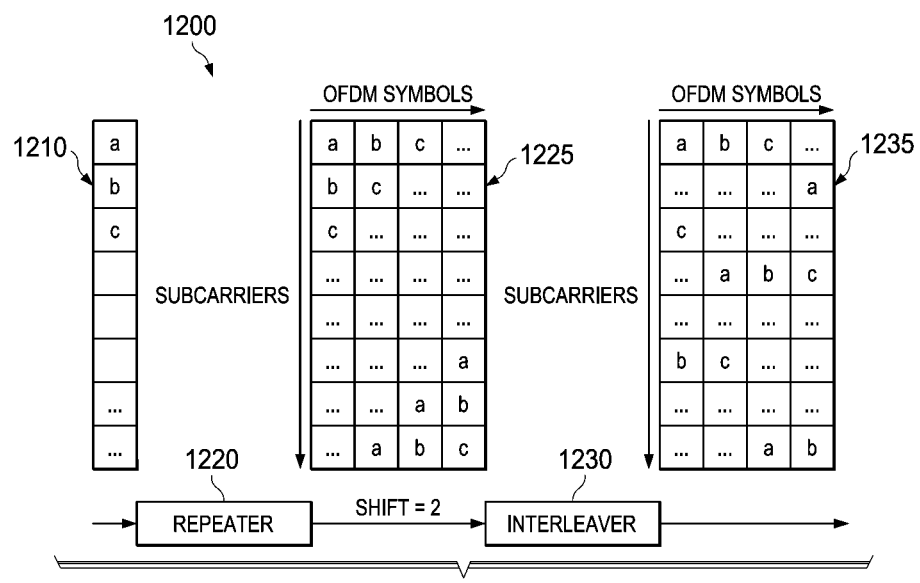
FIG. 12 shows frequency differential modulation setup.

FIG. 12 shows frequency differential modulation setup 1200. The coding structure which follows PRIME Version 1.3.6. Robust modes follow exactly the same as PRIME version 1.4 CENELEC A. Non-robust modes follow PRIME Version 1.3.6. Bit vector associated to one OFDM symbol at the scrambler output is represented at 1210. Results of repeater 1220 output is represented by 1225. After interleaver 1230 is 1235. There are two options for interleaving by interleaver 1230.

Option 1: Interleaving may be done per entire channels that are being used. Extend interleaver 1230 with more number of tones. E.g., if the data tone number is 168 for the header (two subchannels), then use interleaver 1230 with 168 tones. If the data tone number is 192 for the payload (two subchannels), then use interleaver 1230 with 192 tones.

Option 2: Interleaving may be done per a subchannel. Use interleaver 1230 without extension. If the data tone number is 168 for the header (two subchannels), then run two interleavers over each channel. If the data tone number is 192 for the payload (two subchannels), then use interleaver 1230 over each channel.

Embodiments may modulate with respect to nearest pilot instead of previous subcarrier. This allows implementers freedom to implement both basic (differential) and advanced (coherent) receivers. Basic mode receiver is differential demod with a different phase reference. Advanced mode receiver is coherent demod by generating a channel estimate on each pilot tone (averaging with other available pilots).

Figure 13A:
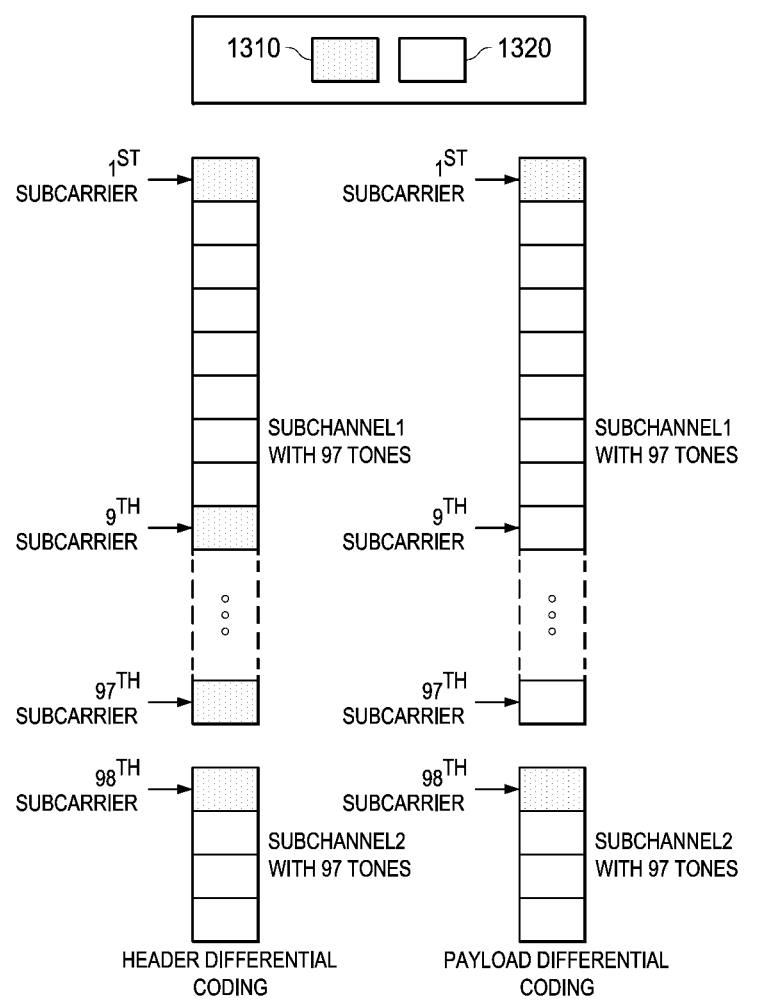
FIG. 13A shows header differential coding and payload differential coding.
Figure 13B:
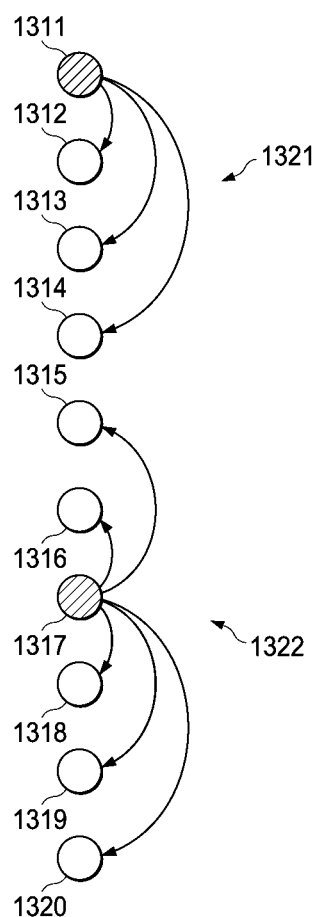
FIG. 13B is a diagram illustrative of a nearest-pilot tone modulation scheme according to some embodiments.

FIG. 13A shows header differential coding and payload differential coding. Pilot subcarrier is black 1310, Data subcarrier is white 1320, FIG. 13B is a diagram illustrating a robust, nearest-pilot tone modulation scheme according to some embodiments. As shown, pilot tones (e.g., 1311 and 1317) are included every $6^{th}$ tone, creating subcarrier groups 1321 and 1322. Therefore, robust header 702 (of FIG. 7) may have 17 pilot tones. Moreover, robust modulation may be performed with respect to the nearest pilot tone ("nearest-pilot tone modulation"). In other words, tones 1312-1314 may use the phase reference provided by pilot tone 1311, whereas tones 1315, 1316, and 1318-1320 may use the phase reference provided by pilot tone 1317, and so on.

In some implementations, by having each tone modulated with respect to its nearest pilot tone, PLC receivers may use differential and/or coherent demodulation schemes. For example, a basic mode receiver may perform a differential demodulation with a given phase reference. On the other hand, an advanced mode receiver may perform coherent demodulation by generating a channel estimate on each pilot tone (e.g., averaging with other available pilots). More specifically, assume that the transmitted symbol Xk (where k in an integer) may be given by: Xk=Xk−ΔUk, where Δ is chosen for every tone so that k−Δ is the nearest pilot tone, |Δ|≤3, and where Uk is an information symbol. Therefore, the received symbol ($Y_k$) may be expressed as: $Y_k$=$H_k X_k+N_k$, where $H_k$ is the channel fading and $N_k$ is noise. In this scenario, a differential decoding scheme may yield a detected symbol ($Z_k$) given by:

$$Z_k = \text{angle}(Y_k Y_{k-1}^*)$$

$$= \text{angle}(H_k H_{k-1}^* X_k X_{k-1}^*), \text{approximating } N_k = 0$$

$$= \text{angle}(H_k H_{k-1}^* U_k),$$

$$\sim \text{angle}(|H_k|^2 U_k), \text{ since } H_k \text{ and } H_{k-\Delta} \text{ are roughly the same phase.}$$

It should be noted that the performance of such differential decoding scheme may vary to the extent that $H_k$ and $H_{k-1}$ may have some phase variation for Δ>1. However, using a coherent decoding scheme, a receiver may know $\{X_k\}$ on all pilot tones. Thus, the receiver may estimate the channel $H_k$ for all tones k, for example, by frequency interpolation, and it may compute $W_k$=angle($Y_k \hat{H}_k^* X_{k-\Delta}^*$) because $X_{k-\Delta}$ is a known pilot symbol. As such, the receiver may be able to estimate the channel fading from the pilot symbols, and the phase reference for all transmitted symbols is known.

For the ARIB band (154.6875 kHz-403.125 kHz), the preamble consists of eight syncP symbols followed by 1.5 syncM symbols. Each syncP symbol is an OFDM symbol whereby the carriers that are in-band have pre-determined phase values, (i.e., the $i^{th}$ subcarrier is modulated by exp(j*θ$_i$)) while the out-of-band carriers are all set to zero. Table 3 gives the phase values for the in-band carriers.

The numerology for the ARIB band is given in Table 3 below.

TABLE 3

Numerology for ARIB band

| Band | Fs | FFT size | Band-Plan | Non-Zero Tone Indices |
|---|---|---|---|---|
| ARIB | 1200 kHz | 256 | 154.6875-403.125 kHz | 33-86 |

There are two possible band-plans for the FCC-Low band in IEEE P1901.2. Both band-plan numerologies are present in Table 4. below:

TABLE 4

Numerology for FCC subbands

| | Band | Fs | FFT size | Band-Plan | Non-Zero Tone Indices |
|---|---|---|---|---|---|
| Option1 | FCC-Low | 1200 kHz | 256 | 37.5-121.875 kHz | 8-26 |
| Option2 | FCC-Low | 1200 kHz | 256 | 37.5-117.1875 KHz | 8-25 |
| | FCC 36 tones | 1200 kHz | 256 | 154.6875-318.75 kHz | 33-68 |
| | FCC 36 tones | 1200 kHz | 256 | 323.4375-487.5 kHz | 69-104 |
| | FCC 18 tones | 1200 kHz | 256 | 154.6875-234.375 kHz | 33-50 |
| | FCC 18 tones | 1200 kHz | 256 | 239.0625-318.75 kHz | 51-68 |
| | FCC 18 tones | 1200 kHz | 256 | 323.4375-403.125 kHz | 69-86 |
| | FCC 18 tones | 1200 kHz | 256 | 407.8125-487.5 kHz | 87-104 |

Band option 1 has 19 sub-carriers whereas Band option 2 has 18 sub-carriers. Band option 2 has the advantage that there is more transition band margin for co-existing with transmissions in the CENELEC-C band. Furthermore, an 18 subcarrier band-plan allows there to be six sub-bands with three tones per sub-band. Table 6-Table 12 give the preamble phase values for FCC subbands.

Likewise the preamble phase values for the CEN-B band are given in Table 13. The CEN-B Band has a band-plan from 98.4375 kHz-121.875 kHz which corresponds to tone indices 63-78 when using a 256 point FFT at a sampling frequency of 400 kHz Tone Index Versus Phase Values

TABLE 5

Phase Values For Preamble in the ARIB-band

| Tone Index | $\theta$ |
|---|---|
| 33 | $2(\pi/8)$ |
| 34 | $(\pi/8)$ |
| 35 | $(\pi/8)$ |
| 36 | 0 |
| 37 | $15(\pi/8)$ |
| 38 | $14(\pi/8)$ |
| 39 | $13(\pi/8)$ |
| 40 | $11(\pi/8)$ |
| 41 | $9(\pi/8)$ |
| 42 | $6(\pi/8)$ |
| 43 | $3(\pi/8)$ |
| 44 | 0 |
| 45 | $12(\pi/8)$ |

TABLE 5-continued

Phase Values For Preamble in the ARIB-band

| Tone Index | $\theta$ |
|---|---|
| 46 | $9(\pi/8)$ |
| 47 | $4(\pi/8)$ |
| 48 | $0(\pi/8)$ |
| 49 | $12(\pi/8)$ |
| 50 | $6(\pi/8)$ |
| 51 | $1(\pi/8)$ |
| 52 | $12(\pi/8)$ |
| 53 | $6(\pi/8)$ |
| 54 | $15(\pi/8)$ |
| 55 | $9(\pi/8)$ |
| 56 | $2(\pi/8)$ |
| 57 | $11(\pi/8)$ |
| 58 | $4(\pi/8)$ |
| 59 | $12(\pi/8)$ |
| 60 | $4(\pi/8)$ |
| 61 | $12(\pi/8)$ |
| 62 | $3(\pi/8)$ |
| 63 | $10(\pi/8)$ |
| 64 | $1(\pi/8)$ |
| 65 | $7(\pi/8)$ |
| 66 | $14(\pi/8)$ |
| 67 | $3(\pi/8)$ |
| 68 | $9(\pi/8)$ |
| 69 | $15(\pi/8)$ |
| 70 | $3(\pi/8)$ |
| 71 | $8(\pi/8)$ |
| 72 | $13(\pi/8)$ |
| 73 | $1(\pi/8)$ |
| 74 | $4(\pi/8)$ |
| 75 | $8(\pi/8)$ |
| 76 | $11(\pi/8)$ |
| 77 | $14(\pi/8)$ |
| 78 | $1(\pi/8)$ |
| 79 | $3(\pi/8)$ |
| 80 | $4(\pi/8)$ |
| 81 | $6(\pi/8)$ |
| 82 | $7(\pi/8)$ |
| 83 | $8(\pi/8)$ |
| 84 | $9(\pi/8)$ |
| 85 | $10(\pi/8)$ |
| 86 | $10(\pi/8)$ |

TABLE 6

Phase Values For Preamble in the FCC- Low band (Band Option 1)

| Tone Index | $\theta$ |
|---|---|
| 8 | $2(\pi/8)$ |
| 9 | $(\pi/8)$ |
| 10 | $15(\pi/8)$ |
| 11 | $14(\pi/8)$ |
| 12 | $11(\pi/8)$ |
| 13 | $7(\pi/8)$ |
| 14 | $2(\pi/8)$ |
| 15 | $12(\pi/8)$ |
| 16 | $6(\pi/8)$ |
| 17 | $14(\pi/8)$ |
| 18 | $6(\pi/8)$ |
| 19 | $12(\pi/8)$ |
| 20 | $2(\pi/8)$ |
| 21 | $7(\pi/8)$ |
| 22 | $11(\pi/8)$ |
| 23 | $14(\pi/8)$ |
| 24 | $15(\pi/8)$ |
| 25 | $1(\pi/8)$ |
| 26 | $2(\pi/8)$ |

TABLE 7

Phase Values For Preamble in the FCC- Low band (Band Option 2)

| Tone Index | θ |
|---|---|
| 8 | 2(π/8) |
| 9 | (π/8) |
| 10 | 15(π/8) |
| 11 | 13(π/8) |
| 12 | 11(π/8) |
| 13 | 6(π/8) |
| 14 | 1(π/8) |
| 15 | 11(π/8) |
| 16 | 4(π/8) |
| 17 | 12(π/8) |
| 18 | 3(π/8) |
| 19 | 9(π/8) |
| 20 | 14(π/8) |
| 21 | 2(π/8) |
| 22 | 5(π/8) |
| 23 | 8(π/8) |
| 24 | 9(π/8) |
| 25 | 10(π/8) |

TABLE 8

Phase Values For Preamble in the 36 tones subband1

| Tone Index | Θ | Tone Index | θ |
|---|---|---|---|
| 33 | 2(π/8) | 51 | 8(π/8) |
| 34 | (π/8) | 52 | 0(π/8) |
| 35 | 0 | 53 | 6(π/8) |
| 36 | 15(π/8) | 54 | 13(π/8) |
| 37 | 14(π/8) | 55 | 3(π/8) |
| 38 | 12(π/8) | 56 | 9(π/8) |
| 39 | 10(π/8) | 57 | 14(π/8) |
| 40 | 7(π/8) | 58 | 3(π/8) |
| 41 | 3(π/8) | 59 | 7(π/8) |
| 42 | 15(π/8) | 60 | 11(π/8) |
| 43 | 11(π/8) | 61 | 15(π/8) |
| 44 | 6(π/8) | 62 | 2(π/8) |
| 45 | 1(π/8) | 63 | 4(π/8) |
| 46 | 12(π/8) | 64 | 6(π/8) |
| 47 | 5(π/8) | 65 | 7(π/8) |
| 48 | 15(π/8) | 66 | 9(π/8) |
| 49 | 8(π/8) | 67 | 10(π/8) |
| 50 | 0 | 68 | 10(π/8) |

TABLE 9

Phase Values For Preamble in the 36 tones subband2

| Tone Index | Θ |
|---|---|
| 69 | 2(π/8) |
| 70 | (π/8) |
| 71 | 0 |
| 72 | 15(π/8) |
| 73 | 14(π/8) |
| 74 | 12(π/8) |
| 75 | 10(π/8) |
| 76 | 7(π/8) |
| 77 | 3(π/8) |
| 78 | 15(π/8) |
| 79 | 11(π/8) |
| 80 | 6(π/8) |
| 81 | 1(π/8) |
| 82 | 11(π/8) |
| 83 | 5(π/8) |
| 84 | 15(π/8) |
| 85 | 7(π/8) |
| 86 | 0 |
| 87 | 8(π/8) |
| 88 | 0(π/8) |
| 89 | 6(π/8) |
| 90 | 13(π/8) |
| 91 | 3(π/8) |
| 92 | 9(π/8) |
| 93 | 15(π/8) |
| 94 | 3(π/8) |
| 95 | 7(π/8) |
| 96 | 11(π/8) |
| 97 | 15(π/8) |
| 98 | 2(π/8) |
| 99 | 4(π/8) |
| 100 | 6(π/8) |
| 101 | 7(π/8) |
| 102 | 8(π/8) |
| 103 | 9(π/8) |
| 104 | 10(π/8) |

TABLE 10

Phase Values For Preamble in the 18 tones subband1

| Tone Index | Θ |
|---|---|
| 33 | 2(π/8) |
| 34 | (π/8) |
| 35 | 0 |
| 36 | 14(π/8) |
| 37 | 11(π/8) |
| 38 | 6(π/8) |
| 39 | 1(π/8) |
| 40 | 11(π/8) |
| 41 | 4(π/8) |
| 42 | 12(π/8) |
| 43 | 3(π/8) |
| 44 | 9(π/8) |
| 45 | 14(π/8) |
| 46 | 2(π/8) |
| 47 | 5(π/8) |
| 48 | 8(π/8) |
| 49 | 9(π/8) |
| 50 | 10(π/8) |

TABLE 11

Phase Values For Preamble in the 18 tones subband2

| Tone Index | Θ |
|---|---|
| 51 | 2(π/8) |
| 52 | (π/8) |
| 53 | 0 |
| 54 | 14(π/8) |
| 55 | 1(π/8) |
| 56 | 6(π/8) |
| 57 | 1(π/8) |
| 58 | 11(π/8) |
| 59 | 4(π/8) |
| 60 | 12(π/8) |
| 61 | 3(π/8) |
| 62 | 9(π/8) |
| 63 | 14(π/8) |
| 64 | 3(π/8) |
| 65 | 5(π/8) |
| 66 | 8(π/8) |
| 67 | 9(π/8) |
| 68 | 10(π/8) |

TABLE 12

Phase Values For Preamble in the 18 tones subband3

| Tone Index | Θ |
|---|---|
| 69 | 2(π/8) |
| 70 | (π/8) |
| 71 | 0 |
| 72 | 14(π/8) |
| 73 | 11(π/8) |
| 74 | 6(π/8) |
| 75 | 1(π/8) |
| 76 | 11(π/8) |
| 77 | 4(π/8) |
| 78 | 12(π/8) |
| 79 | 3(π/8) |
| 80 | 9(π/8) |
| 81 | 14(π/8) |
| 82 | 3(π/8) |
| 83 | 5(π/8) |
| 84 | 8(π/8) |
| 85 | 9(π/8) |
| 86 | 10(π/8) |

TABLE 13

Phase Values For Preamble in the 18 tones subband4

| Tone Index | Θ |
|---|---|
| 87 | 2(π/8) |
| 88 | (π/8) |
| 89 | 0 |
| 90 | 14(π/8) |
| 91 | 11(π/8) |
| 92 | 6(π/8) |
| 93 | 1(π/8) |
| 94 | 11(π/8) |
| 95 | 4(π/8) |
| 96 | 12(π/8) |
| 97 | 3(π/8) |
| 98 | 9(π/8) |
| 99 | 14(π/8) |
| 100 | 3(π/8) |
| 101 | 5(π/8) |
| 102 | 7(π/8) |
| 103 | 9(π/8) |
| 104 | 10(π/8) |

TABLE 14

Phase Values For Preamble in the CEN-B band

| Tone Index | Θ |
|---|---|
| 63 | 2(π/8) |
| 64 | (π/8) |
| 65 | 15(π/8) |
| 66 | 13(π/8) |
| 67 | 10(π/8) |
| 68 | 5(π/8) |
| 69 | 15(π/8) |
| 70 | 8(π/8) |
| 71 | 0 |
| 72 | 7(π/8) |
| 73 | 13(π/8) |
| 74 | 2(π/8) |
| 75 | 5(π/8) |
| 76 | 7(π/8) |
| 77 | 9(π/8) |
| 78 | 10(π/8) |

Disclosed embodiments may be applied to a variety of PLC standards, including OFDM-based PLC standards such as PRIME, G3, ITU G.hnem, IEEE P1901.2 and the like.

Figure 14:
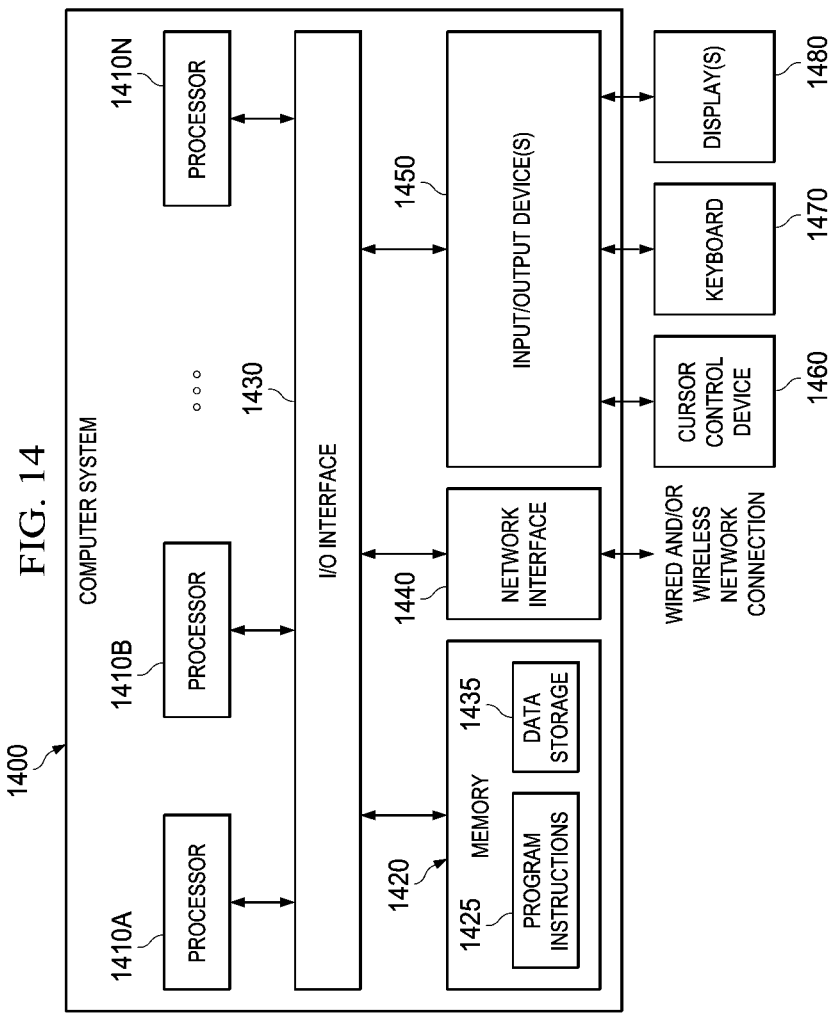
FIG. 14 is a block diagram of a computing system configured to implement certain systems and methods described herein according to some embodiments.

As noted above, in certain embodiments, systems and methods for building transmitting, and receiving robust header and payload structures may be implemented or executed by one or more computer systems. One such system is illustrated in FIG. 14. In various embodiments, system 1400 may be a server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, computer system 1400 includes one or more processors 1410 coupled to a system memory 1420 via an input/output (I/O) interface 1430. Computer system 160 further includes a network interface 1440 coupled to I/O interface 1430, and one or more input/output devices 1425, such as cursor control device 1460, keyboard 1470, display(s) 1480, and/or mobile device 1490. In various embodiments, computer system 1400 may be a single-processor system including one processor 1410, or a multi-processor system including two or more processors 1410 (e.g., two, four, eight, or another suitable number). Processors 1410 may be any processor capable of executing program instructions. For example, in various embodiments, processors 1410 may be general-purpose or embedded processors implementing any of a variety of instruction set architectures (ISAs), such as the x814, POWERPC®, ARM®, SPARC®, or MIPS® ISAs, or any other suitable ISA. In multi-processor systems, each of processors 1410 may commonly, but not necessarily, implement the same ISA. Also, in some embodiments, at least one processor 1410 may be a graphics processing unit (GPU) or other dedicated graphics-rendering device.

System memory 1420 may be configured to store program instructions and/or data accessible by processor 1410. In various embodiments, system memory 1420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 1420 as program instructions 1425 and data storage 1435, respectively. In other embodiments, program instructions and/or data may be received, sent or stored upon different types of computer-accessible media or on similar media separate from system memory 1420 or computer system 1400. Generally speaking, a computer-accessible medium may include any tangible storage media or memory media such as magnetic or optical media—e.g., disk or CD/DVD-ROM coupled to computer system 1400 via I/O interface 1430. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 1440.

In one embodiment, I/O interface 1430 may be configured to coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. In addition, in some embodiments some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems, or between nodes of computer system 1400. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, mobile devices, or any other devices suitable for entering or retrieving data by one or more computer system 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

As shown in FIG. 14, memory 1420 may include program instructions 1425, configured to implement certain embodiments described herein, and data storage 1435, comprising various data accessible by program instructions 1425. In an embodiment, program instructions 1425 may include software elements of embodiments illustrated in the above figures. For example, program instructions 1425 may be implemented in various embodiments using any desired programming language, scripting language, or combination of programming languages and/or scripting languages (e.g., C, C++, C#, JAVA®, JAVASCRIPT®, PERL®, etc.). Data storage 1435 may include data that may be used in these embodiments (e.g., recorded communications, profiles for different modes of operations, etc.). In other embodiments, other or different software elements and data may be included.

A person of ordinary skill in the art will appreciate that computer system 1400 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It will be understood that various operations discussed herein may be executed simultaneously and/or sequentially. It will be further understood that each operation may be performed in any order and may be performed once or repetitiously. In various embodiments, the operations discussed herein may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc. Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention will come to mind to one skilled in the art to which this Disclosure pertains having the benefit of the teachings presented in the foregoing descriptions, and the associated drawings. Therefore, it is to be understood that embodiments of the invention are not to be limited to the specific embodiments disclosed. Although specific terms are employed herein, they are used in a generic and descriptive sense only and not for purposes of limitation.

We claim:

1. A method comprising:
   performing, by a power line communication (PLC) device,
   receiving a packet data unit (PDU) having a preamble, a header and a payload;
   applying bit-level repetition to at least one portion of the PDU to create a robust PDU;
   interleaving, using an interleaver, per a subchannel, if the data tone number is 168 for the header, then using 168 data tones in the interleaving;
   inserting pilot tones in the interleaved portion;
   modulating each data tone, having a data tone number, in the interleaved portion with respect to a nearest one of the inserted pilot tones to create the robust PDU; and
   transmitting the robust PDU over a power line.

2. The method of claim 1, wherein the PLC device includes a PLC modem.

3. The method of claim 1, further comprising using two interleavers over each channel.

4. The method of claim 1, wherein the preamble comprising a plurality of sync symbols wherein a plurality of in-band carriers that are in-band have pre-determined phase values while a plurality of out-of-band carriers are all set to zero.

5. A method comprising:
performing, by a power line communication (PLC) device,
receiving a packet data unit (PDU) having a preamble, a header and a payload;
applying bit-level repetition to at least one portion of the PDU to create a robust PDU;
interleaving, using an interleaver, per a subchannel, if the data tone number is 192 for the payload, then using 192 tones in the interleaving;
inserting pilot tones in the interleaved portion;
modulating each data tone, having a data tone number, in the interleaved portion with respect to a nearest one of the inserted pilot tones to create the robust PDU; and
transmitting the robust PDU over a power line.

6. The method of claim 5, wherein the PLC device includes a PLC modem.

7. The method of claim 5, further comprising using two interleavers over each channel.

8. The method of claim 5, wherein the preamble comprising a plurality of sync symbols wherein a plurality of in-band carriers that are in-band have pre-determined phase values while a plurality of out-of-band carriers are all set to zero.

9. A power line communication (PLC) device comprising:
a processor; and
a memory coupled to the processor, the memory configured to store program instructions executable by the processor to cause the PLC device to:
receive a packet data unit (PDU) having a preamble, a header and a payload;
apply bit-level repetition to at least one portion of the PDU to create a robust PDU;
interleave, using an interleaver, per a subchannel, if the data tone number is 168 for the header, then using 168 data tones in the interleaving;
insert pilot tones in the interleaved portion;
modulate each data tone, having a data tone number, in the interleaved portion with respect to a nearest one of the inserted pilot tones to create the robust PDU; and
transmit the robust PDU over a power line.

10. The PLC device of claim 9, wherein the preamble comprising a plurality of sync symbols wherein a plurality of in-band carriers that are in-band have pre-determined phase values while a plurality of out-of-band carriers are all set to zero.

11. The PLC device of claim 9, wherein the processor includes a digital signal processor (DSP), an application specific integrated circuit (ASIC), a system-on-chip (SoC) circuit, a field-programmable gate array (FPGA), a microprocessor, or a microcontroller.

12. The PLC device of claim 9, comprising a PLC modem.

13. The PLC device of claim 9, further comprising two interleavers for interleaving over each channel.

14. A power line communication (PLC) device comprising:
a processor; and
a memory coupled to the processor, the memory configured to store program instructions executable by the processor to cause the PLC device to:
receive a packet data unit (PDU) having a preamble, a header and a payload;
apply bit-level repetition to at least one portion of the PDU to create a robust PDU;
interleave, using an interleaver, per a subchannel, if the data tone number is 192 for the payload, then using 192 tones in the interleaving;
insert pilot tones in the interleaved portion;
modulate each data tone, having a data tone number, in the interleaved portion with respect to a nearest one of the inserted pilot tones to create the robust PDU; and
transmit the robust PDU over a power line.

15. The PLC device of claim 14, wherein the processor includes a digital signal processor (DSP), an application specific integrated circuit (ASIC), a system-on-chip (SoC) circuit, a field-programmable gate array (FPGA), a microprocessor, or a microcontroller.

16. The PLC device of claim 14, comprising a PLC modem.

17. The PLC device of claim 14, further comprising two interleavers for interleaving over each channel.

18. The PLC device of claim 14, wherein the preamble comprising a plurality of sync symbols wherein a plurality of in-band carriers that are in-band have pre-determined phase values while a plurality of out-of-band carriers are all set to zero.

19. A computer program product of computer-readable instructions, tangibly embodied on a non-transitory computer-readable medium and executable by a digital data processor to perform actions directed toward transmitting a signal, the computer-readable instructions configured to cause a power line communication PLC device to:
receive a packet data unit (PDU) having a preamble, a header and a payload;
apply bit-level repetition to at least one portion of the PDU to create a robust PDU;
interleave, using an interleaver, per a subchannel, if the data tone number is 168 for the header, then using 168 data tones in the interleaving;
insert pilot tones in the interleaved portion;
modulate each data tone, having a data tone number, in the interleaved portion with respect to a nearest one of the inserted pilot tones to create the robust PDU; and
transmit the robust PDU over a power line.

20. A computer program product of computer-readable instructions, tangibly embodied on a non-transitory computer-readable medium and executable by a digital data processor to perform actions directed toward transmitting a signal, the computer-readable instructions configured to cause a power line communication PLC device to:
receive a packet data unit (PDU) having a preamble, a header and a payload;
apply bit-level repetition to at least one portion of the PDU to create a robust PDU;
interleave, using an interleaver, per a subchannel, if the data tone number is 192 for the payload, then using 192 tones in the interleaving;
insert pilot tones in the interleaved portion;
modulate each data tone, having a data tone number, in the interleaved portion with respect to a nearest one of the inserted pilot tones to create the robust PDU; and
transmit the robust PDU over a power line.

* * * * *